(12) United States Patent
Zhao et al.

(10) Patent No.: US 10,789,429 B2
(45) Date of Patent: Sep. 29, 2020

(54) VISUALIZING COMMENT SENTIMENT

(71) Applicant: INTUIT INC., Mountain View, CA (US)

(72) Inventors: Runhua Zhao, San Jose, CA (US); Danni Jin, Sunnyvale, CA (US); Chris Wang, Pleasanton, CA (US)

(73) Assignee: INTUIT, INC., Mountain View, CA (US)

( * ) Notice: Subject to any disclaimer, the term of this patent is extended or adjusted under 35 U.S.C. 154(b) by 45 days.

(21) Appl. No.: 16/197,749

(22) Filed: Nov. 21, 2018

(65) Prior Publication Data

US 2020/0159829 A1 May 21, 2020

(51) Int. Cl.
*G06F 17/27* (2006.01)
*G06F 40/30* (2020.01)
*G06T 11/20* (2006.01)

(52) U.S. Cl.
CPC ............ *G06F 40/30* (2020.01); *G06T 11/206* (2013.01)

(58) Field of Classification Search
CPC ................................ G06F 40/30; G06T 11/206
USPC ............................................................ 704/9
See application file for complete search history.

(56) References Cited

U.S. PATENT DOCUMENTS

| | | | |
|---|---|---|---|
| 8,595,151 B2 | 11/2013 | Hao et al. | |
| 9,792,377 B2* | 10/2017 | Hao | G06Q 30/0205 |
| 9,812,151 B1* | 11/2017 | Amini | G06T 13/40 |
| 10,037,491 B1* | 7/2018 | Fang | G06F 40/30 |
| 10,275,838 B2* | 4/2019 | DeLuca | H04L 67/306 |
| 10,599,769 B2* | 3/2020 | Osbourne | G06N 3/0454 |
| 10,606,846 B2* | 3/2020 | Li | G06N 7/005 |
| 2011/0246921 A1* | 10/2011 | Mercuri | G06F 3/0481 715/771 |
| 2013/0046756 A1* | 2/2013 | Hao | G06Q 30/0201 707/723 |

(Continued)

FOREIGN PATENT DOCUMENTS

| | | |
|---|---|---|
| JP | 2016-021174 A | 2/2016 |
| JP | 2016530651 A | 9/2016 |

(Continued)

OTHER PUBLICATIONS

PCT/US2019/043898, International Search Report/Written Opinion dated Nov. 15, 2019, 11 pages.

*Primary Examiner* — Khai N. Nguyen
(74) *Attorney, Agent, or Firm* — Patterson & Sheridan, LLP (57) ABSTRACT

Certain aspects of the present disclosure provide techniques for displaying sentiment of a user text comment. One example method generally includes receiving a text comment comprising a sequence of words, providing a vector sequence representing the sequence of words to a sentiment model configured to output a sequence of sentiment scores for the vector sequence and providing cleaned text to a topic module configured to output relevance scores. The method further includes receiving, from the sentiment model, the sequence of sentiment scores for the vector sequence and receiving, from the topic module, the relevance scores for the cleaned text. The method further includes determining, final sentiment scores for each word of the sequence of words and generating a sentiment visualization for the sequence of words showing the final sentiment scores corresponding to each word of the sequence of words.

20 Claims, 8 Drawing Sheets

(56) References Cited

U.S. PATENT DOCUMENTS

| | | | |
|---|---|---|---|
| 2014/0344243 A1* | 11/2014 | Hao | G06F 16/29 |
| | | | 707/710 |
| 2017/0308985 A1* | 10/2017 | Grom | G06Q 50/18 |
| 2018/0373682 A1* | 12/2018 | McCann | G06F 40/47 |
| 2019/0065610 A1* | 2/2019 | Singh | G06F 16/9535 |
| 2019/0340235 A1* | 11/2019 | Osbourne | G06K 9/6256 |
| 2019/0342195 A1* | 11/2019 | Mermoud | G06F 40/20 |

FOREIGN PATENT DOCUMENTS

| | | |
|---|---|---|
| KR | 2011-0038247 A | 4/2011 |
| KR | 101491628 B1 | 2/2015 |
| KR | 2018-0113438 A | 10/2018 |

* cited by examiner

VISUALIZING COMMENT SENTIMENT

INTRODUCTION

Aspects of the present disclosure relate to using machine learning techniques to analyze text comments.

Application providers frequently offer various feedback channels for users to relay their experiences with applications. The user feedback can be used to develop and maintain the application. For example, a comment and review interface may be provided that allows users to rate their experience with the application and leave a comment explaining their rating. Comments may be received as text from an input device, as audio, as an image or as other methods of input. The comments can be read by feedback agents (or developers) in order to determine issues with the application. For example, if a feedback agent reads dozens of comments complaining of a particular issue, development or bug fixing teams may be alerted to the issue. However, for large applications with a large number of users, thousands of comments may be received on a daily basis, making human reading of all comments impractical. Many application providers therefore employ automated processes to allow a computing device to analyze comments.

However, existing systems for automating comment analysis have several drawbacks. First, comments, like speech, may convey more information than the bare identification of topics. For example, comments may convey a sentiment, whether negative or positive, about topics mentioned in the comment. Further, existing methods that do perform sentiment analysis may prepare only a high-level sentiment analysis for an entire comment, which is ineffective for comments that mention multiple topics, both positively and negatively. For example, a comment could be sharply critical of a first topic and highly praising of a second topic, which may be graded as neutral sentiment overall. Such a grading obfuscates both the negative sentiment of the first topic and the positive sentiment of the second topic.

Second, the information prepared by automatic comment analysis may be suitable only for an analyst with both the technical knowledge to understand the analysis system and the business knowledge to analyze the comments themselves. For example, one who is inexperienced in such analysis may struggle to understand the output of the comment analysis automation. Existing methods of automatic comment analysis do not provide easy to understand output for non-technical experts. Existing methods that do provide understanding aids such as a clustering of keywords or a word cloud of keywords, do not identify a topic associated with the keywords, making analysis of such aids time consuming as well. Further, such aids may make no distinction between relevant and irrelevant keyword associations, requiring analysis of keywords that are not important to the analyst. Further still, existing methods provide no way of displaying a change in sentiment for a topic over time, helping the analyst to establish trends in the data.

Thus, systems and methods are needed to automate comment analysis that can perform word-by-word (or, in-sentence) analysis of the sentiment and topic of comments and prepare this word-by-word data to be consumed by non-experts.

BRIEF SUMMARY

Certain embodiments provide a method for displaying sentiment of a user text comment. The method generally includes receiving a text comment comprising a sequence of words, providing a vector sequence representing the sequence of words to a sentiment model configured to output a sequence of sentiment scores for the vector sequence and providing cleaned text to a topic module configured to output relevance scores. The method further includes receiving, from the sentiment model, the sequence of sentiment scores for the vector sequence and receiving, from the topic module, the relevance scores for the cleaned text. The method further includes determining, final sentiment scores for each word of the sequence of words and generating a sentiment visualization for the sequence of words showing the final sentiment scores corresponding to each word of the sequence of words.

Other embodiments include a computing device comprising a processor and memory including instructions that cause the computing device to perform the method for displaying sentiment of a user text comment described above. Still other embodiments provide a computer readable medium storing instructions that can cause a computing device to perform the method for displaying sentiment of a user text comment described above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

The ability to effectively automate analysis of user comments relating to a software application can lead to improved and more efficient development (or maintenance) of the software application. For example, by analyzing user comments, an analyst may be able to determine if recent changes to the application are leading to user dissatisfaction with the software application (e.g., if a recent patch or update has changed software functionality). Analysis of user comments may also allow an analyst to determine what issues (such as bugs, logic flaws or other programming errors) are hindering use of the software application for users. Conversely, analysis of user comments may allow an analyst to determine the strengths or high points of an application, which can similarly be used to direct development by identifying what aspects of the application are well-liked. For applications where many comments may be received frequently, human analysis of all comments is not advantageous or practical, so software providers tend to rely on various automatic systems to analyze user comments.

However, existing systems of automatic comment analysis may be limited to identifying topics or concepts covered by a particular comment, which does not cover other features, such as sentiment, that a human analyst may be able to readily determine. In existing systems, analysis of texts for sentiment requires a separate sentiment analysis system from a topic analysis system. The sentiment system typically requires unique input and produces unique output (as compared to the topic analysis system). As discussed herein, by utilizing a system that produces separate (but related) input and maintains two analysis models, effective automation of analyzing text data, such as user comments, is possible.

In particular, the systems and methods disclosed herein relate to comment analysis by way of a sentiment model and a topic module. The comment analysis method receives a text comment and prepares two inputs for processing using various preprocessing and vectorization steps. The prepared inputs are fed to the sentiment model and the topic module, and the resulting outputs are matched to determine both the sentiment and the topics covered by the text comment on a word-by-word basis. Existing automatic comment analysis systems fail to perform sentiment analysis using word-level granularity, and instead measure sentiment on a sentence-by-sentence or comment-by-comment basis. Word-by-word analysis allows a single text to be analyzed for sentiment of more than one topic. If only measured at sentence level, only a single sentiment can be derived from a text.

Also discussed herein are methods for generating visualizations of text analysis data, which allow non-experts to use comment analysis data to determine trends in user comments about various parts of a software application. By use of such visualizations, non-experts may be able to effectively direct development and management of the application in order to improve application performance and user satisfaction with the application. This is an improvement over existing automatic comment analysis systems, which typically produce output that may need to be interpreted by an expert (e.g., a technician that designed the system or a frequent user of the system) in order for non-experts (e.g., managers or development leaders) to be able to use comment analysis data.

Figure 1:
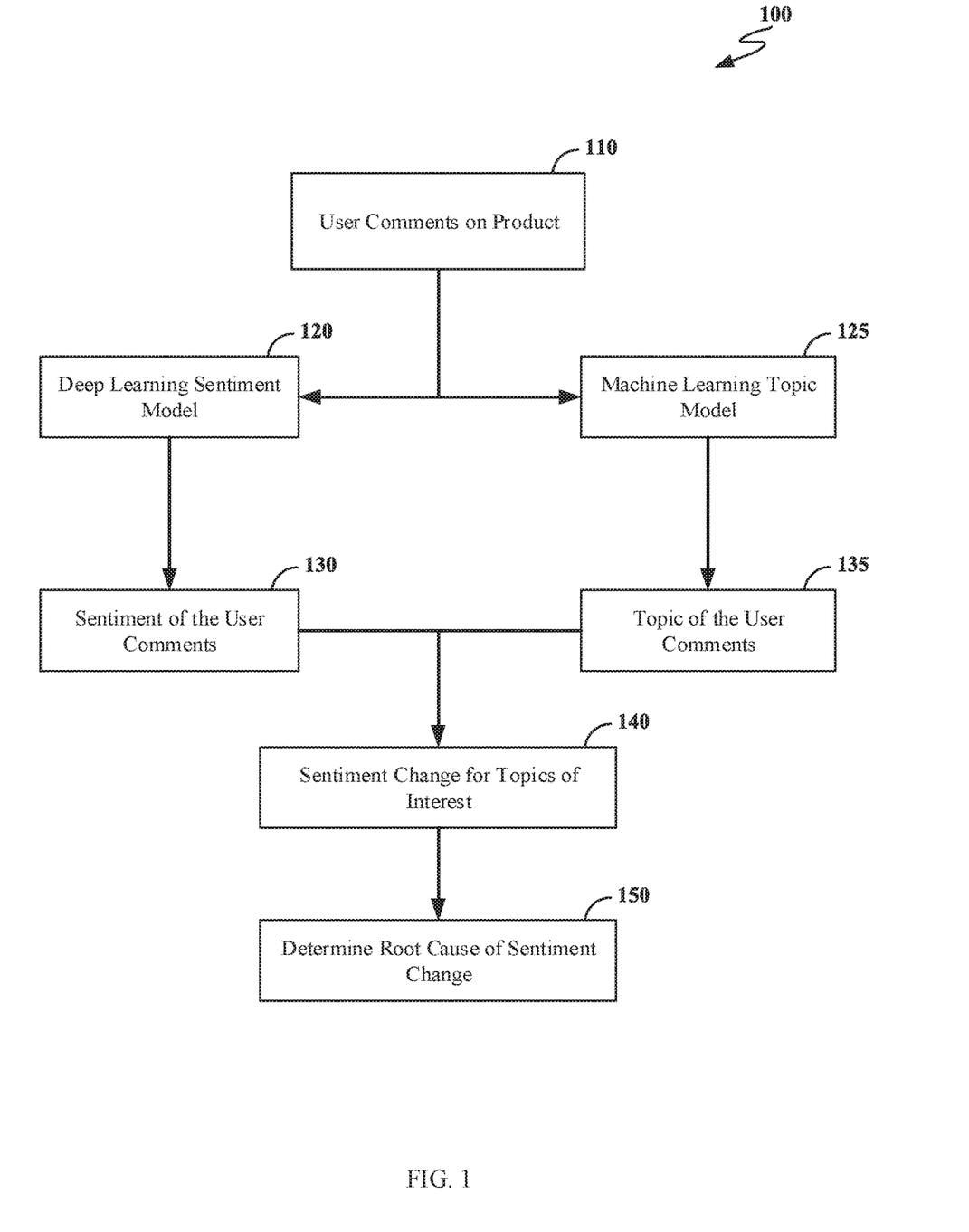
FIG. 1 is a conceptual diagram of a process of automating analysis of a user comment.

FIG. 1 is a conceptual diagram of a process 100 of automating analysis of a user comment. Process 100 starts with the receipt of user comments on a product, as shown at 110. As discussed above, analyzing the complete meaning of a user comment involves analysis of both the sentiment and the topics of the user comment. As a result, in process 100, the analysis is broken into two paths. Sentiment is analyzed by the path represented by 120 and 130, while topics are analyzed by the path represented by 125 and 135.

At 120, the user comments received at 110 are passed to a deep learning sentiment model, for analysis of the sentiment displayed by the user comments. The deep learning sentiment model is a bi-directional long short term memory (Bi-LSTM) model. The operation of Bi-LSTM models are described in further detail below with respect to FIG. 4. In general, the deep learning sentiment model, and associated components, generate vector representations of the text of the received user comments, and, as shown at 130, produce the sentiment of the user comments as output. The sentiment is produced on a word by word basis, in order to later correlate the sentiment of a particular word with the topic of the particular word.

In parallel, the user comments are also passed to a machine learning topic model at 125, for analysis of the topics mentioned in the user comments. The operation of the machine learning model is described in further detail below. In general, the machine learning topic model performs natural language processing on the text of the user comments, and then uses vector representations of the text after processing to identify topics mentioned by the user comments. The machine learning topic model, as shown at 135, produces these identified topics as output. Like the sentiment produced at 130, the topics are identified on a word by word basis.

At 140, the sentiment of the user comments and the topic of the user comments are combined to determine how the sentiment has changed for various topics over time. Because both sentiment and topics are determined on a word by word basis, the respective sentiment and related topic of a given word can be correlated to determine the sentiment of particular topics. The sentiment change may be limited to certain periods of time, such as since a most recent update to the product.

At 150, using the sentiment change produced at 140, it may be possible to determine the root cause of sentiment change overall, by examining which topics have largest change in sentiment individually. In many cases, it may be difficult to determine the cause of a a downturn in user opinion of a product. By analyzing both the sentiment and topics covered by user comments on a word by word basis, it is possible to determine the topics most responsible for any such changes. In turn, determining the topics most responsible may enable an examination of recent changes to those topics themselves, and allow a developer to correct any problems with those topics.

Figure 2:
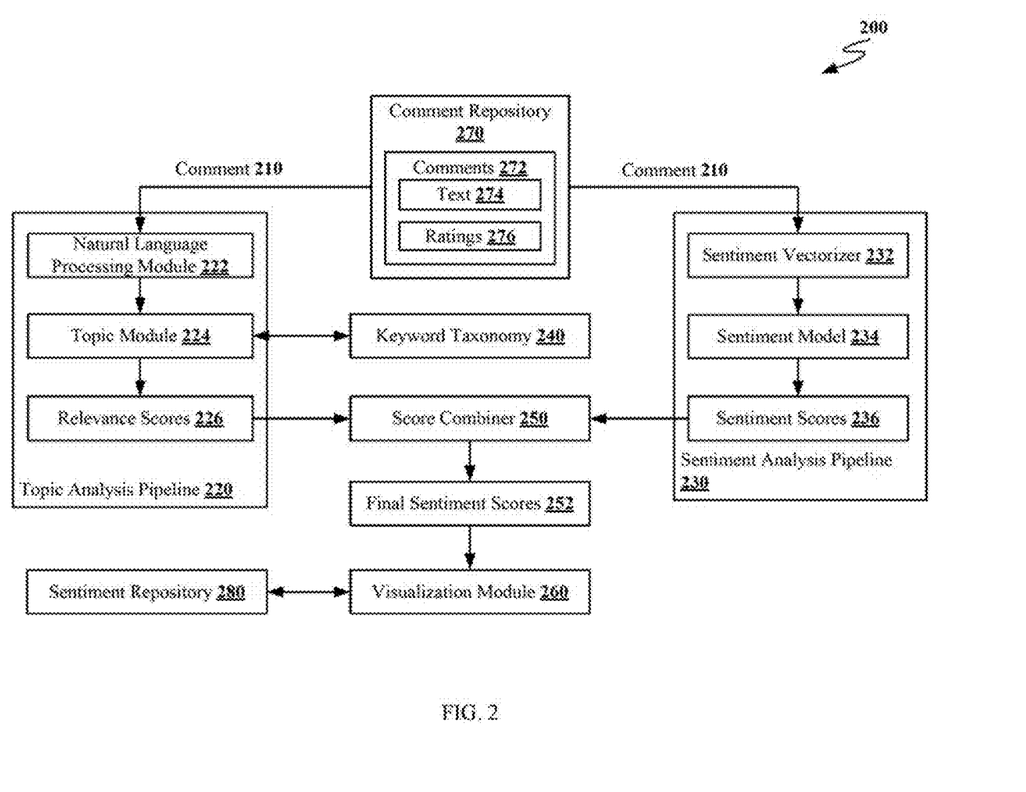
FIG. 2 depicts an example comment analysis system.

FIG. 2 depicts an example comment analysis system 200. Comment analysis system 200 is used to perform methods described herein, such as a method for displaying sentiments of user text comments. In some implementations, comment analysis system 200 may include a computing device comprising a processor, a memory, and a storage (not shown) comprising instructions that, when executed by the processor using the memory, perform, for example, the method for displaying sentiment of user text comments.

Comment analysis system 200 may be configured to receive feedback from, for example, a software application that includes a feedback system, which allows users of the application to post comments (as well as ratings) of the software application. For example, the application may ask a user to provide a numeric rating between 1 and 10 and provide comments explaining why the user gave whatever rating when chosen.

Comment analysis system 200 may receive user comments from comment repository 270 (and analyze the user comments to determine, for example, (1) topics covered by the user comments and (2) the sentiment of the user comments. Comment analysis system 200 then uses the determined topics and sentiments to generate a weighted final sentiment score for each of the user comments, and then generates a visualization of the sentiments based on the final sentiment scores associated with each user.

In this example, comment analysis system 200 includes topic analysis pipeline 220, sentiment analysis pipeline 230, keyword taxonomy 240, score combiner 250, final sentiment scores 252, visualization module 260, comment repository 270 and sentiment repository 280. Comment repository 270 may be a storage device used to store comments 272 from users of one or more software applications. As shown, comment repository 270 includes a plurality of comments 272, which in turn include text 274 and ratings 276.

Comments received from users may include, for example, a message (e.g., text 274) and a score rating the user's experience with the software application (e.g., ratings 276). The message may be formatted as text entered via an input device, such as a touchscreen or a keyboard of an electronic device. The message may also be received as audio recorded by a microphone, and processed using natural language processing, to determine a text representation of the audio. As yet another example, the message may also be formatted as an image containing text (e.g., an image of a paper document taken by a digital camera or scanned in via a scanner), and processed using optical character recognition (OCR) to determine a text representation of the image.

In general, comment analysis system sends text 274 (shown as comment 210) to both topic analysis pipeline 220 and sentiment analysis pipeline 230, which thereafter analyze the sentiment and topic (or topics) of text 274.

Ratings 276 along with text 274 can also be used to train sentiment model 234. As ratings 276 is a score representing the experience of the user, it can be used as a label for a given text (e.g., a ground truth by which to train a sentiment-based machine learning model). Training based on comments 272 is described further with respect to FIG. 3.

Topic analysis pipeline 220 includes natural language processing module 222, topic module 224 and relevance scores 226.

Natural language processing module 222 is a software routine that performs various preprocessing tasks on the text of comment 210 (e.g., "cleaning" the text). Such cleaning tasks include removing stop words, performing tokenization, performing stemming, removing non-English words, removing punctuation or replacing hypertext markup language (HTML) syntax with English grammar. Natural language processing module 222 produces "cleaned" texts (e.g., texts that have been preprocessed), which are then sent to topic module 224.

One cleaning process performed by natural language processing module 222 is stop word removal. Stop words may be removed before vectorization in order to improve processing time and efficiency, because they are common words that convey little meaning, but may complicate searching for phrases. Common stop words include prepositions and articles, such as "the," "is," "at," "which" or "on". Identifying stop words to remove can be performed by utilizing a pre-defined list of English stop words.

Stemming is another cleaning process performed by natural language processing module 222. Stemming is the process of reducing inflected (or sometimes derived) words to their word stem, base, or root form. Stemming algorithms such as Porter's Algorithm and others may be applied during stemming. Lemmatization is a more complex approach to determining a stem of a word that involves first determining the part of speech of a word, and applying different normalization rules for each part of speech. In lemmatization, the part of speech is first detected prior to attempting to find the root since for some languages, the stemming rules change depending on a word's part of speech. In some cases, stemming and lemmatization approaches may be used together in hybrid approaches.

A further cleaning process performed by natural language processing module 222 is tokenization. Tokenization is the process of converting a sequence of characters (such as a word) into a token with an assigned meaning. For example, the word "apple" may be associated with a dictionary ID "123" whereas "orange" may be associated with a dictionary ID "241". Some methods used to identify tokens in text include: regular expressions, specific sequences of characters termed a flag, specific separating characters called delimiters, and explicit definition by a dictionary. Special non-alphabetical characters, including punctuation characters, are commonly used to identify tokens because of their natural use in written languages; however, tokenization may ultimately eliminate all the non-alphabetical symbols in the original text.

Other cleaning processes in addition to the processes mentioned above may be performed by natural language processing module 222. When the cleaning processes are complete, natural language processing module 222 passes the cleaned text to topic module 224. In this example, topic module 224 is a software routine executing on comment analysis system 200. Topic module 224 accepts cleaned text from natural language processor 222, generates vector representations of the cleaned text, and determines relevance scores 226 for the produced vector representations. To generate the vector representations, topic module 224 may make use of a vectorization tool such as word2vec.

To determine relevance scores 226 for the vector representations, topic module 224 uses keyword taxonomy 240. Keyword taxonomy 240 defines a plurality of topics covered by the software application analyzed by comment analysis system 200. Keyword taxonomy 240 is a layered hierarchy of topics and keywords used to identify topics. Keyword taxonomy 240 may be created by a user (e.g., a technician or operator of comment analysis system 200) specifying a set of topics and a set of keywords (seed keywords) corresponding to each topic of the set of topics. Then the user may use a phrasing model to determine additional keywords to be added to keyword taxonomy 240. In this example, the phrasing model makes use of the seed keywords to identify related keywords (relevant keywords) in the cleaned text based on the collocation frequency of words penalized by their document frequency. In some embodiments the phrasing model may be Gensim, an unsupervised semantic modeler. Keyword taxonomy 240 is then the set of topics, with associated keywords (seed keywords and relevant keywords).

If the software application an accounting application, possible topics may relate to a function of the software application (e.g., "log-in," "printing," "online version" etc.), an accounting topic (e.g., "payroll," "expenses," etc.) or topics related to the user experience (e.g., "price increase"). Each of the topics are associated with a set of keywords. The keywords are a set of words known to be related to a particular topic. For example, the topic "billing" may have keywords such as "bill" or "credit card."

To determine relevance scores 226, topic module 224 plots the vector representations in a vector space. The vector space is initially created by topic module 224 using keyword taxonomy 240. In general, topic module 224 generates keyword vectors for the keywords of keyword taxonomy 240, and plots the keyword vectors in the vector space. When so plotted, topic module 224 identifies clusters within the vector space. These clusters correspond to the topics of keyword taxonomy 240 (e.g., the keywords of a particular topic are clustered together). With these identified clusters, topic module 224 can plot a new vector (or set of vectors) in the vector space and determine a similarity between the word represented by the new vectors and the topic, by comparing the cosine similarity of the new vector to the existing clusters.

In this example, topic module 224 plots the vector representations of the cleaned text within the vector space. Then, topic module 224 determines relevance scores 226 for the vector representations, which show a similarity between the vector representations and the topics. For example, if topic module 224 analyzes vectors for association with ten topics, topic module 224 outputs ten relevance scores for each individual vector of the vector representation.

In one example, the relevance is measured by first determining the cosine similarity of each vector representation of the cleaned text to each of the keyword vectors. Then, an average cosine similarity for a vector to all the keyword vectors of a cluster is determined. This average cosine similarity can be used as a relevance score (e.g., between 0 and 1) for the topic associated with that cluster. When scored between 0 and 1, 0 may indicate the vector is not relevant to the cluster associated with a topic and 1 may indicate the highest level of relevance between the vector and the cluster associated with the topic.

Relevance scores 226 also include an indication of which keyword is the most relevant to each vector, determined by locating the keyword vector for each topic with the highest cosine similarity to the vector. For example, a vector representing the word "bug" may have, for the topic "website version," the highest cosine similarity with the keyword vector representing "error" of the keyword for "website version."

Sentiment analysis pipeline 230 includes sentiment vectorizer 232, sentiment model 234, and sentiment scores 236. Sentiment vectorizer 232 performs vectorization of the text of comment 210. In some implementations, a tool such as Global Vectors (GloVe) can be used to create vectors representing individual words from text-based data. Sentiment vectorizer 232 produces a sequence of vectors representing the text of comment 210.

Notably, the text of comment 210 is rendered into two different vectors by comment analysis system 200—one for use within topic analysis pipeline 220 and one for use within sentiment analysis pipeline 230. This is because each topic analysis pipeline 220 and sentiment analysis pipeline have different considerations for how the vectors are prepared.

Consider the example text comment "Payroll is really broken!" The text used to generate vectors for sentiment analysis pipeline 230 is typically not cleaned prior to vectorization, so sentiment vectorizer 232 generates five vectors: [Payroll], [is], [really], [broken], [!]. By contrast, to generate vectors for topic analysis pipeline 220, natural language processor 222 performs cleaning tasks, such as stop word removal, punctuation removal and stemming. Stop word and punctuation removal may reduce the above text to "Payroll broken" and stemming may change "broken" to "broke" or "break." Thus, after cleaning and vectorization, the text "Payroll is really broken!" may be represented as two vectors: [payroll], [break].

Removal of stop words and punctuation (e.g., "is," "really" and "!") may improve topic analysis, by reducing the total number of vectors to analyze. Further, stemming may also improve topic analysis by substituting a more easily searchable word or phrase (e.g., "break" for "broken"). However, these changes may reduce the effectiveness of sentiment analysis. In this example, "broken" may convey a more negative sentiment than "break." Additionally, the modifier "really" and the punctuation "!" increase this negative sentiment. Thus, the vectors [Payroll], [is], [really], [broken], [!] may be better suited to performing sentiment analysis, while the vectors [payroll], [break] may be better suited to performing topic analysis.

In the example of "Payroll is really broken!", the vector sequence generated by sentiment vectorizer 232 is provided to sentiment model 234 as input. In some embodiments, sentiment model 234 is a time-dependent deep learning model, such as a Bi-LSTM model. Such models are well suited for use in analyzing the sentiment of a word, as they have high flexibility and interpretability. However, in other examples, sentiment model 234 may be another type of machine learning model.

In some cases, sentiment model 234 may be trained on a separate computing device. The training of sentiment model 234 is described in greater detail below with respect to FIG. 3.

Sentiment model 234 accepts a sequence of vectors representing a sentence as input and outputs sentiment scores 236 for the sequence of vectors. In some examples, a sentiment score may be on a scale from −1 to 1, with −1 being the most negative sentiment and 1 being the most positive sentiment. Sentiment model 234 analyzes the vector sequence and outputs a sentiment score for each vector of the vector sequence, with the sentiment score for each vector being dependent on the sentiment scores for vectors preceding the vector in the vector sequence. Because each vector represents a word of the original text, each sentiment score can be said to correspond to a word of the text.

The vector sequence is analyzed by sentiment model 234 recursively, meaning that a vector sequence of length N can be analyzed as N fragments. The first fragment is the first vector alone, the second fragment is the first two vectors, the third fragment is the first three vectors, and so on, until the Nth fragment covers all N vectors. Because the fragment N contains all N vectors of the vector sequence, fragment N is identical to the vector sequence itself.

By analyzing each of the fragments separately, sentiment model 234 is able to determine the sentiment of the text vector-by-vector (corresponding to word-by-word), where each vector is weighted by the vectors that precede the vector in sequence. Weighting is used as the sentiment of a sequence of words may be more meaningful than the sentiment of a single word alone. Additionally, weighting is used to account for words that modify the sentiment of nearby words but include little meaning alone. For example, the phrase "very unhappy" should produce a lower sentiment score than the word "unhappy" alone, and similarly, the phrase "very happy" should produce a higher sentiment score than the word "happy" alone.

As an example, consider the comment "Website is buggy and unreliable" which may be rendered as the vector sequence [website], [is], [buggy], [and], [unreliable]. When analyzed in sequence, sentiment model 234 may produce a sentiment score of 0 (neutral sentiment) for the first two fragments ([website] and [website], [is]), but a sentiment score of −0.3 for the third fragment due to the negative sentiment of the word "buggy." The fourth fragment ([website], [is], [buggy], [and]) may also receive a sentiment score of −0.3 as "and" is a neutral sentiment word that does not modify the sentiment compared to the third fragment. However, the full sequence may be given a sentiment score of −0.6, which accounts for the additional negative sentiment of the word "unreliable" on top of the existing negative sentiment for the fourth fragment. The sentiment scores of the fragments would therefore be, in sequence, {0, 0, −0.3, −0.3, −0.6}. By correlating this sequence of sentiment scores to the sequence of words of the text, visualization module 260 may be able to produce a visual guide showing a decrease in sentiment over the course of the comment.

Score combiner 250 is a software routine executing as part of comment analysis system 200 used to generate final sentiment scores 252 for comment 210. To generate final sentiment scores 252, score combiner 250 matches sentiment scores 236 with relevance scores 226.

As discussed above, the input provided to sentiment model 234 and topic module 224 are not identical, so the two outputs may not correspond to each other. As a result, score combiner 250 may use approximate string matching (e.g., fuzzy matching) to match sentiment scores 236 with keywords associated with relevance scores 226. After matching sentiment scores 236 with relevance scores 226, score combiner 250 determines final sentiment scores 252 associated with each topic for the text of user comment 210. Final sentiment scores indicate a relevance of comment 210 to a topic, as well as a sentiment of comment 210 for that topic.

The sentiment of a final sentiment score may be based on a sentiment score for a keyword, or a group of keywords, found to be related to the topic. For example, the comment "The timesheet is clunky to use" may have a final sentiment score for the topic "payroll" with a relevance of 1, a sentiment of −0.31 and may identify "timesheet" as a keyword. The same comment may have a final sentiment score for the topic "website issue" with a relevance of 0.7, a sentiment of −0.95 and may identify "clunky" as a keyword.

Visualization module 260 is software routing executing as part of comment analysis system 200 used to generate sentiment visualizations of final sentiment scores 252, as produced by score combiner 250.

In one embodiment, sentiment visualizations may be color-coded by sentiment and show each topic relevant to the final sentiment scores. An example of sentiment visualizations are shown below with respect to FIG. 6.

Figure 5:
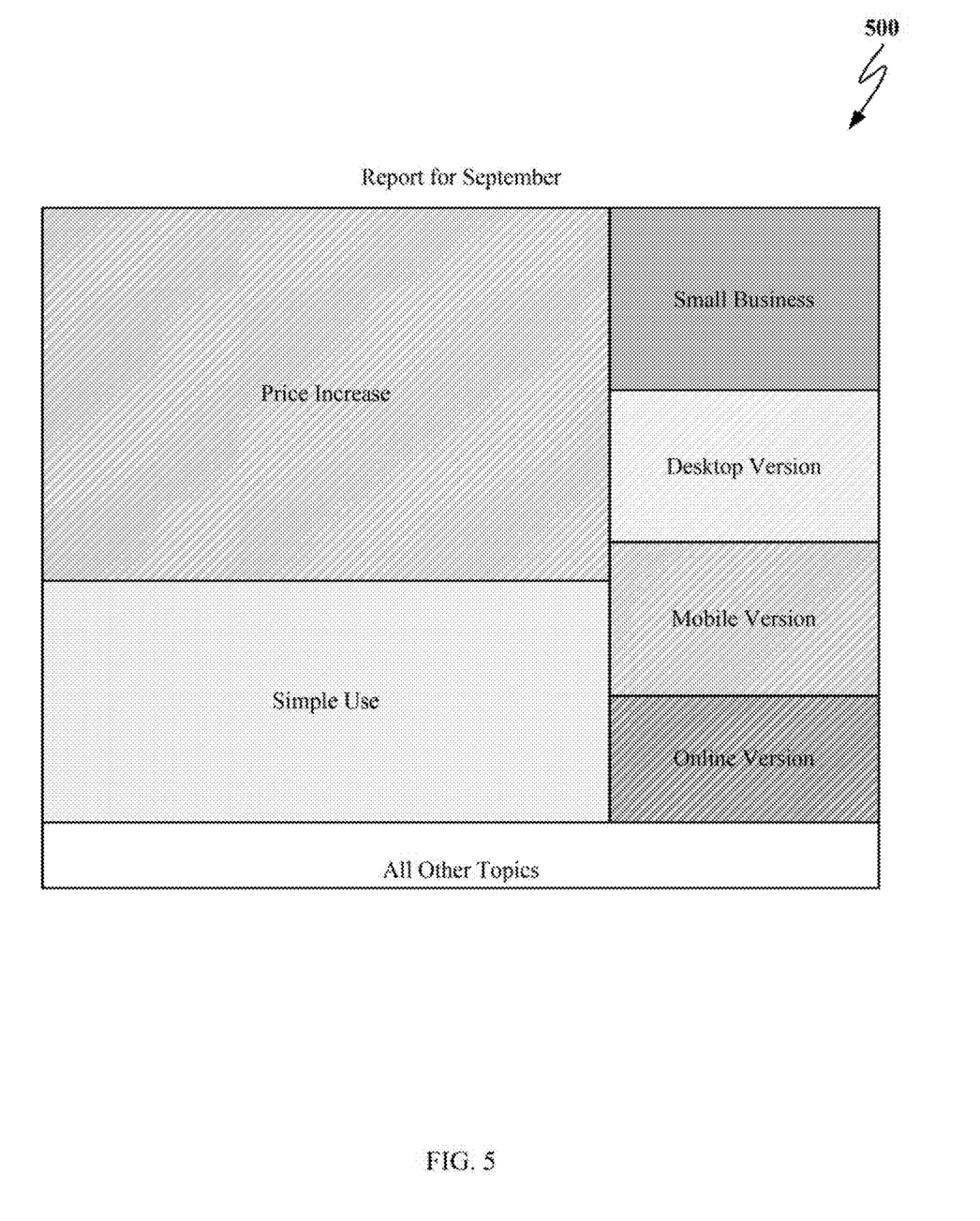
FIG. 5 depicts an example sentiment trend visualization.

Sentiment repository 280 is used to store final sentiment scores for previously analyzed user comments. In some examples, visualization module 260 may obtain a plurality of previous final sentiment scores from sentiment repository 280 and use the plurality of previous final sentiment scores to generate a sentiment trend. In general, the sentiment trend shows a change in sentiment (either negative or positive) for a given topic over time. Comment analysis system 200 may also generate a sentiment trend visualization for display locally on comment analysis system 200 or on a separate display device. An example of a sentiment trend visualization is shown below with respect to FIG. 5A.

The use of comment analysis system 200 to determine sentiment visualizations for topics may be used in the development and maintenance of software applications. For example, low-sentiment topics may be used by managers or administrators of the software application to drive development of the software application, such as by directing attention or resources to the upkeep or improvement of topics are associated with low sentiment scores. By so directing development and maintenance, the eventual user experience of the software application may also be improved.

Figure 3:
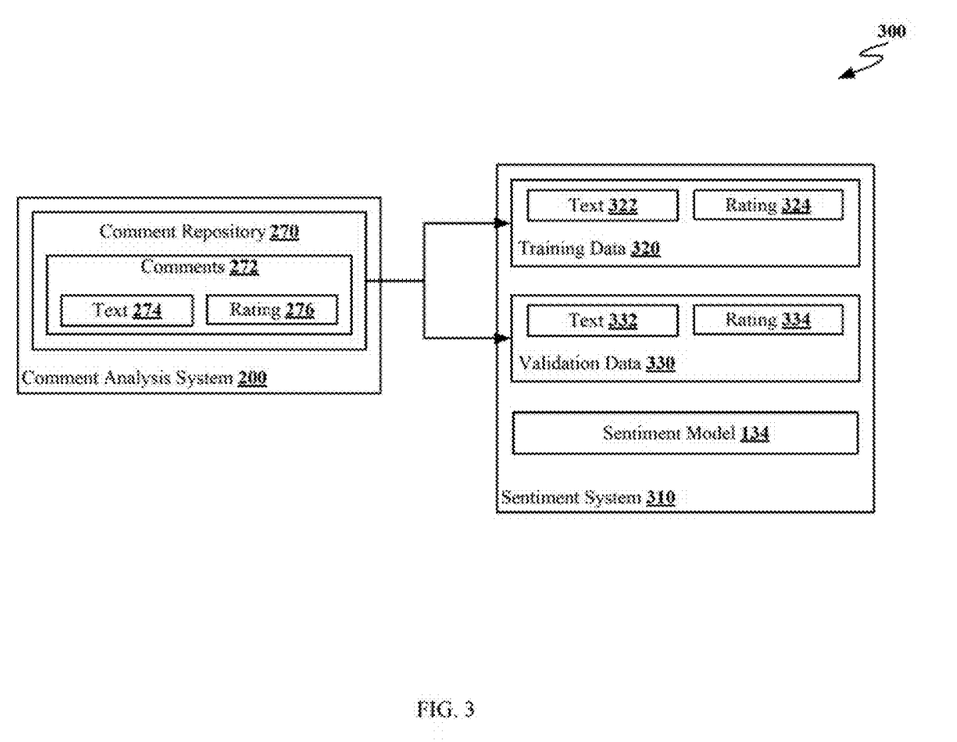
FIG. 3 depicts an example computing environment for training a sentiment model.

FIG. 3 depicts an example computing environment 300 for training sentiment model 234. Computing environment 300 includes comment analysis system 200 and sentiment system 310. Sentiment system 310 may represent a computing device including a processor, a memory and a storage (not shown). Sentiment system 310 is used to train sentiment model 234. In this example, sentiment system 310 includes training data 320, validation data 330, and sentiment model 234.

Training data 320 includes vectors 322 and labels 324. Vectors 322 represent words in the text of comments (e.g., comments 272). In this example, texts 274 of comments 272 are obtained by sentiment system 310 from comment repository 270, and are thereafter vectorized and stored as vectors 322. Likewise, labels 324 are ground-truth training labels and are obtained from ratings 276 associated with comments 272.

Sentiment system 310 uses training data 320 in order to train sentiment model 234. In general, vectors 322 are provided as input to sentiment model 234, which produces an estimated output based on vectors 322. The estimated output is then compared to labels 324, and the difference (if any) between the estimated output and labels 324 is used to adjust execution parameters of sentiment model 234. This process may be performed iteratively, and may be performed many times until the estimated output produced by sentiment model 234 exceeds an accuracy threshold, or until the improvement in the estimated output falls below a threshold for iterative improvement.

After training, sentiment model 234 may be tested by using validation data 330 to verify training is complete. Validation data 330 includes vectors 332 and labels 334, which also correspond, respectively, to text 274 and ratings 276, but vectors 332 were not used in the training of sentiment model 234.

When the training of sentiment model 234 is complete, sentiment system 310 transfers sentiment model 234 to comment analysis system 200 for execution. In other examples, sentiment model 234 may execute on sentiment system 310 or on a cloud computing or distributed computing system.

Figure 4:
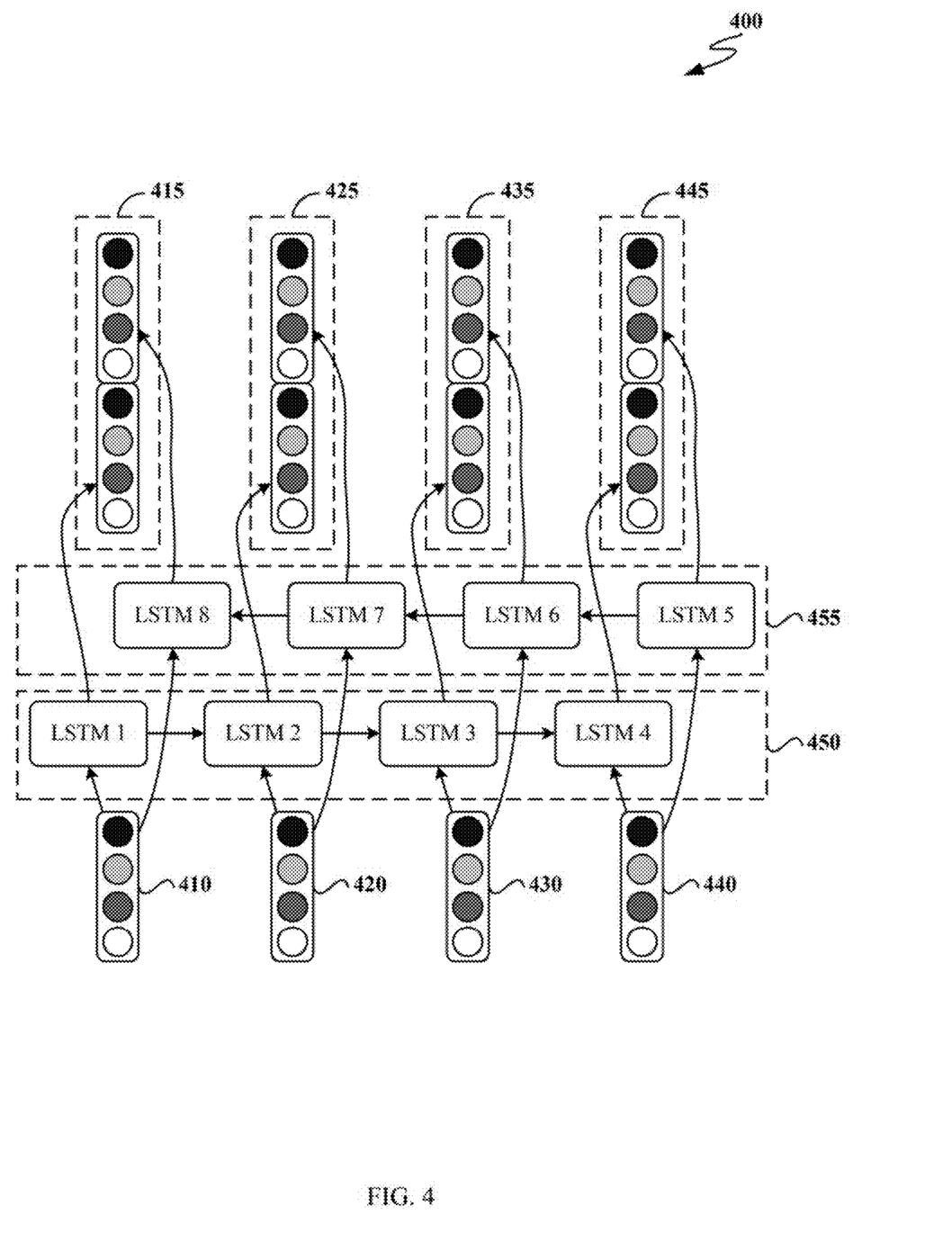
FIG. 4 is a conceptual diagram of the operation of a bidirectional long short term memory model.

FIG. 4 is a conceptual diagram 400 of the operation of a bidirectional long short term memory model. Diagram 400 includes four vector representations of words, 410, 420, 430 and 440, as well as eight LSTM cells 1-8 and four sentiment analyses 415, 425, 435 and 445, each corresponding to a vector representation. The four sentiment analyses have two sections, a forwards analysis (shown as the bottom of each sentiment analysis) and a backwards analysis (shown as the top of each sentiment analysis). A Bi-LSTM consists of a number of LSTM cells, which each take one of the vector representations as input. Each LSTM cell also pushes forward its output to the next LSTM in sequence. Because the Bi-LSTM is bidirectional, it includes two series of LSTM cells, shown as 450 and 455. The Bi-LSTM model in diagram 400 includes eight individual LSTM cells, four as the forward direction (450) and four as the backward direction (455). The exact number of LSTM cells in a Bi-LSTM model is arbitrary, however.

In operation, LSTM 1 of 450 takes vector 410 as input. LSTM 1 then outputs the sentiment analysis of vector 410 to both 415 and to LSTM 2. LSTM 2 takes the sentiment analysis of vector 410 as well as vector 420 as input. Thus, the sentiment analysis of vector 420 takes into account the sentiment analysis of vector 410. LSTM 2 then outputs the sentiment analysis of to both LSTM 3 and 425. This process continues for LSTM 3 and LSTM 4, so that the sentiment analysis of vector 430 (shown as the bottom half of 435) includes the sentiment analysis of vectors 410 and 420, and the sentiment analysis of vector 440 includes the sentiment analysis of vectors 410, 420 and 430. For example, if vectors 410, 420, 430 and 440 represent the words "payroll is really broken," the forwards sentiment analysis at 415 is for "payroll," the forwards sentiment analysis at 425 is for "payroll is," the forwards sentiment analysis at 435 is for "payroll is really," and the forwards sentiment analysis at 445 is for "payroll is really broken."

A similar process is performed by LSTM 5-8 for the backwards direction, resulting in both a forwards and backwards sentiment analysis for each of the four vectors. Performing a backwards analysis may improve the sentiment analysis for some sentence structures, for example when the most significant word for sentiment purposes is the last word in a sentence.

FIG. 5 depicts example sentiment trend visualization 500. As shown, sentiment trend visualization 500 is a box graph. In this example, the size of each box reflects a relative frequency of comments about a particular topic. In sentiment trend visualization 500, the largest box is associated with the topic "price increase", which indicates that for the time period represented by sentiment trend visualization 500 (in this case, the month of September) "price increase" was the most frequent topic in user comments.

In the example depicted in FIG. 5, different shading is used to differentiate the boxes by sentiment. Boxes with lined shading (the topics "price increase," "desktop version," "mobile version" and "online version") show negative sentiment for that topic, while unlined shading (the topics "simple use" and "small business") show positive sentiment for that topic. The darkness of the shading represents strength of sentiment, either positive or negative. Thus, the darkly shaded box for topic "small business" indicates a high positive sentiment for "small business," while the darkly shaded box for "online version" indicates a high negative sentiment for "online version." In this example shading and lines are used to represent sentiment, but in other examples color coding, font type and formatting, and other visual indications may be used to represent sentiment. For example, shades of green may be used to represent positive sentiment and shades of red may be used to represent negative sentiment.

A sentiment trend visualization displays at least the relative (e.g., high or low) sentiment for topics that have occurred frequently in comments over the time period shown by the sentiment trend visualization.

For example, consider a system that evaluates twenty topics, and produces sentiment trend visualizations for a month prior to the generation date of the sentiment trend visualization. In such a system, the top ten topics in volume for the past month may be shown as a separate box while the bottom ten topics in volume may be shown as a combined box. In general, a threshold may be applied to show only a certain number of topics of the total topics or a certain number of topics of the total volume (e.g., the topics making up the top fifty percent of recent comments).

Sentiment trend visualization 500 is a box graph, but in other examples sentiment trend visualizations may be other types of graphs or visual aids. For example, sentiment trend visualization may be a radar chart where each wedge of the radar chart represents a topic of the plurality of topics and the width of each wedge represents a volume of the topic of the comments received during the month. Like the box graph, the color of each wedge represents the type (e.g., positive or negative) of sentiment for the topic, but unlike the box graph the strength of the sentiment may be shown by the radius of each wedge.

Sentiment trend visualization 500 may be generated by a visualization module, such as visualization module 260 of FIG. 2. Sentiment trend visualization 500 may be displayed on a display device connected to the computing device executing the visualization module, or may be transmitted to a separate display device.

Figure 6:
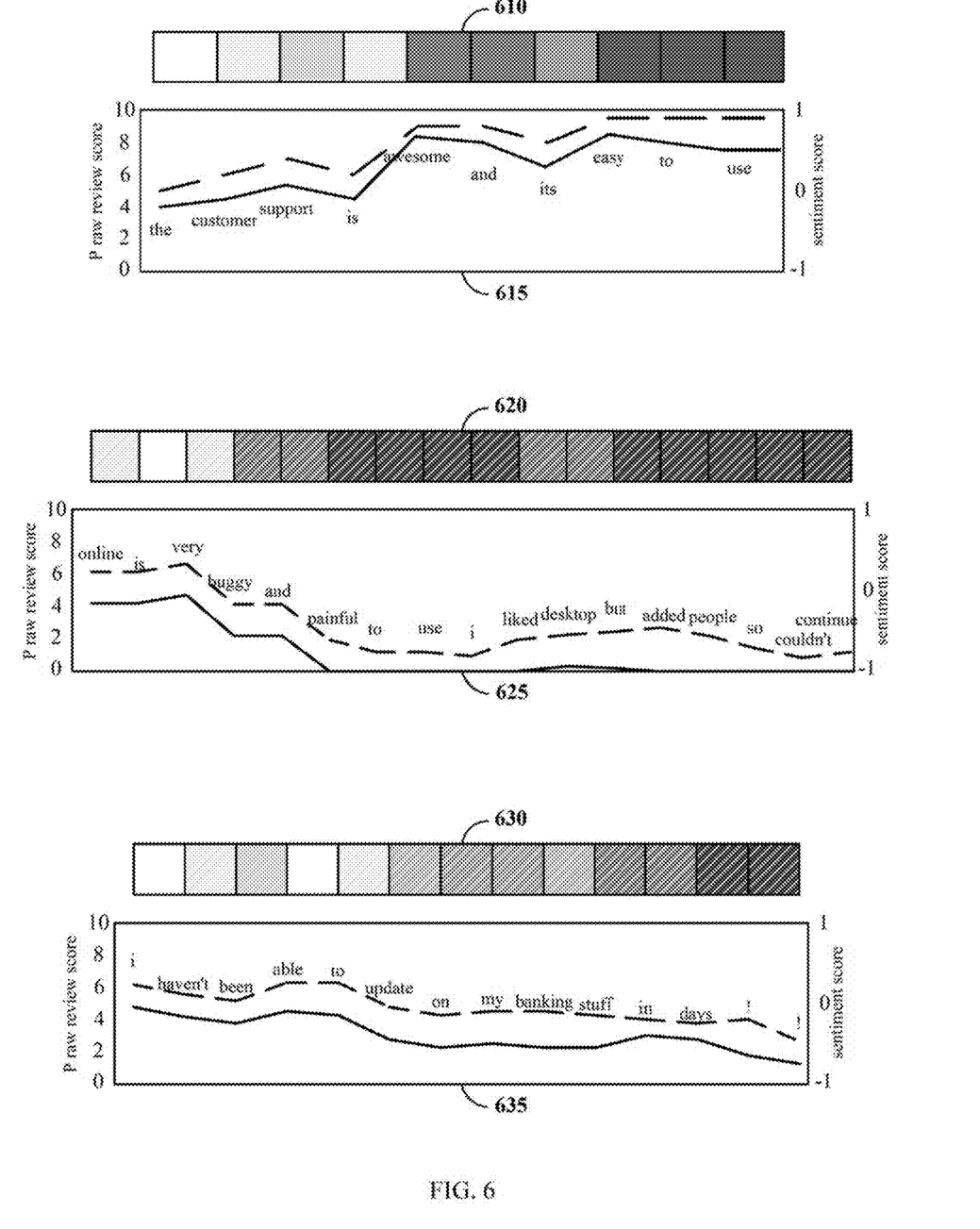
FIG. 6 depicts example sentiment visualizations for user comments.

FIG. 6 depicts example sentiment visualizations 615, 625 and 635, for three user comments. Sentiment visualization 615 is for the text of the user comment "the customer support is awesome and its easy to use." Sentiment visualization 615 includes two charted lines, the solid line for sentiment score (scaled from −1 to 1 as shown at the right) and the dotted line for P raw review score, scaled from 0 to 10. P raw review score represents the expected review score for the comment based on the analysis up to and including the current word. In this example, the words "is the customer support is" are neither very positive nor very negative, so the points for those words are in the middle of the line charts. The word "awesome," however, is positive, so the point for "awesome" is higher on the line charts. In general, upward motion in the lines indicates a positive sentiment word and downward motion in the liens indicates a negative sentiment word.

Color chart 610 is a separate indication of the sentiment of the text. Following the pattern used in FIG. 5, darker shades indicate higher magnitude sentiment, and line shading indicates negative sentiment. As with FIG. 5, in other examples color coding may instead be used to represent positive and negative sentiment.

Sentiment visualization 625 shows the text of the user comment "online is very buggy and painful to use I liked desktop but added people so couldn't continue", and color chart 620 shows the high and low points of sentiment for the comment. The lowest sentiment words can be measured by highest negative gradient between points. In this example, "buggy" and "painful" result in the most steep (highest gradient) between two words in the comment, and are thus the lowest sentiment words of the comment.

Sentiment visualization 635 shows the text of the user comment "i haven't been able to update on my banking stuff in days ! !", and color chart 630 shows the high and low points of sentiment for the comment. Sentiment visualization 635 shows a generally neutral but slightly negative sentiment comment. The most negative word of the comment is "update." "Update" can in some cases be a positive sentiment word, but in the context of the preceding phrase "haven't been able to" it is recognized as a negative sentiment word.

A sentiment visualization may show at least the strength and type of sentiment for each word of a text comment. In this example, sentiment visualization 615, 625 and 635 show positive, neutral or negative sentiment for each word of the text. A sentiment visualization can be useful for showing the relative sentiment of words in a comment, and which words of the comment cause the sentiment for the comment to be overall negative or overall positive.

Figure 7:
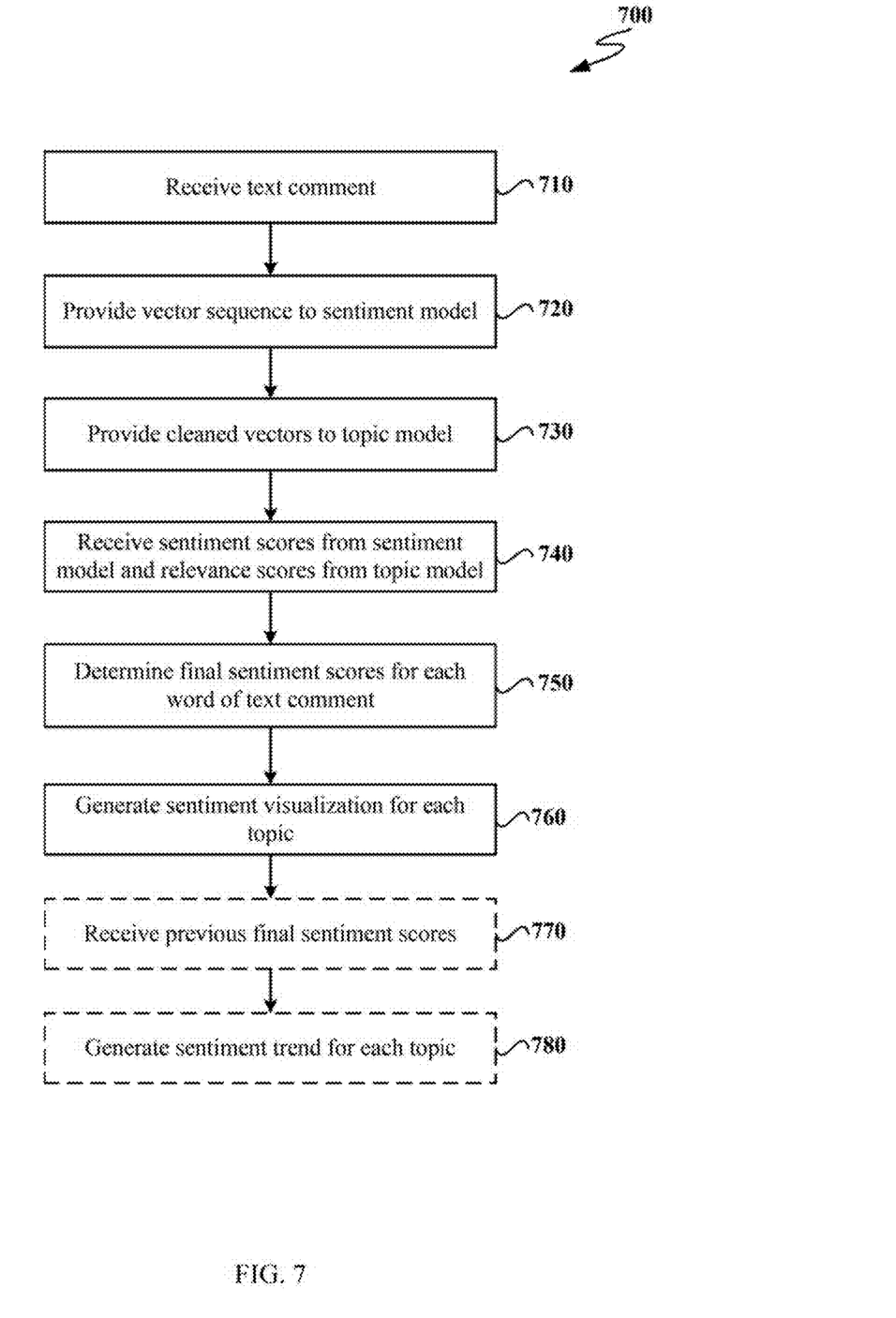
FIG. 7 is a flow diagram illustrating an example method for displaying sentiment of a user text comment.

FIG. 7 is a flow diagram illustrating an example method 700 for displaying sentiment of a user text comment. Method 700 may be performed by a comment analysis system, such as comment analysis system 200 of FIG. 2.

Method 700 begins at 710 where the comment analysis system obtains a text comment comprising a sequence of words. As discussed above, the comment analysis system may be associated with a software application, and the text comment may be obtained from a comment repository that stores user comments related to the software application. The comments may be initially received in a variety of formats (such as text or audio) but the comment analysis system typically obtains the comments from the comment repository as the sequence of words.

At 720, the comment analysis system provides a vector sequence representing each of the sequence of words to a sentiment model configured to output a sequence of sentiment score for the vector sequence. As discussed above, the vector sequence is typically not preprocessed before vectorization in order to preserve sentiment expressed by the sequence of words.

At 730, the comment analysis system provides cleaned text to a topic module configured to output relevance scores associated with each topic of a plurality of topics for vector representations of the cleaned text. The cleaned text, is preprocessed before vectorization. Such preprocessing allows for more efficient searching for relevance of vector representations of the cleaned text.

At 740, the comment analysis system receives, from the sentiment model, the sentiment scores for the vector sequence and also receives, from the topic module, the relevance scores for the cleaned text. The sentiment scores indicate the sentiment of the vector sequence (and thus the sequence of words underlying the vector sequence), and the relevance scores indicate the association between the sequence of words and a set of topics.

At 750, the comment analysis system determines, based on the sentiment score scores for the vector sequence combined with the relevance scores for the cleaned text, final sentiment scores for each of the sequences of words. Final sentiment scores indicate a sentiment associated with each topic for each word. As discussed above, to determine final sentiment scores the comment analysis system may use string matching (such as fuzzy matching) to associate sentiment scores (based on non-processed text) with relevance scores (based on pre-processed text). After associating the scores the comment analysis system may determine, using various mathematical computations, the final sentiment scores.

At 760, the comment analysis system generates, based on the final sentiment scores, a sentiment visualization for the sequence of words showing the final sentiment scores corresponding to each word of the sequence words. The sentiment visualization is a visual display of the information represented by the final sentiment scores. As discussed above, the sentiment visualization displays at least the relative sentiment of each word of the sequence of words.

In some embodiments, method 700 also includes 770, where the comment analysis system receives a plurality of previous final sentiment scores from a sentiment repository. The sentiment repository may be an external device connected to the comment analysis system or may be a storage device within the comment analysis system. In general, the comment analysis system generates final sentiment scores for user comments and stores them in the sentiment repository.

In some embodiments, method 700 also includes 780, where the comment analysis system generates, based on the final sentiment scores and the plurality of previous final sentiment scores, a sentiment trend for each topic of the plurality of topics showing a change in sentiment over time for each topic of the plurality of topics. Over time, enough final sentiment scores may be generated and stored to determine trends in the final sentiment scores.

In some cases, method 700 further includes the comment analysis system generating a trend visualization for each topic of the plurality of topics based on the sentiment trend for each topic. As discussed above, a sentiment trend visualization displays at least the relative sentiment for topics that have had high volume in comments for a given time period.

In some embodiments of method 700 prior to being provided the cleaned text, the topic module plots vector representations of a plurality of keywords associated with the plurality of topics. In still other embodiments of method 700, the topic module determines the relevance scores by determining a cosine similarity between vector representations of the cleaned text and the vector representations of the plurality of keywords.

The sentiment score for the each vector of the vector sequence is weighted based on sentiment scores for preceding vectors in the vector sequence in some examples of method 700.

In some embodiments of method 700, the sentiment model is a time-dependent deep learning model trained using user comments labeled with comment ratings.

In certain examples of method 700, the sentiment visualization is a box graph color coded by topic. In other examples, the sentiment visualization is a radar chart for a given month, wherein each wedge of the radar chart represents a topic of the plurality of topics, a width of each wedge represents a volume of the topic and a radius and color of each wedge represents a strength of sentiment for the topic.

Figure 8:
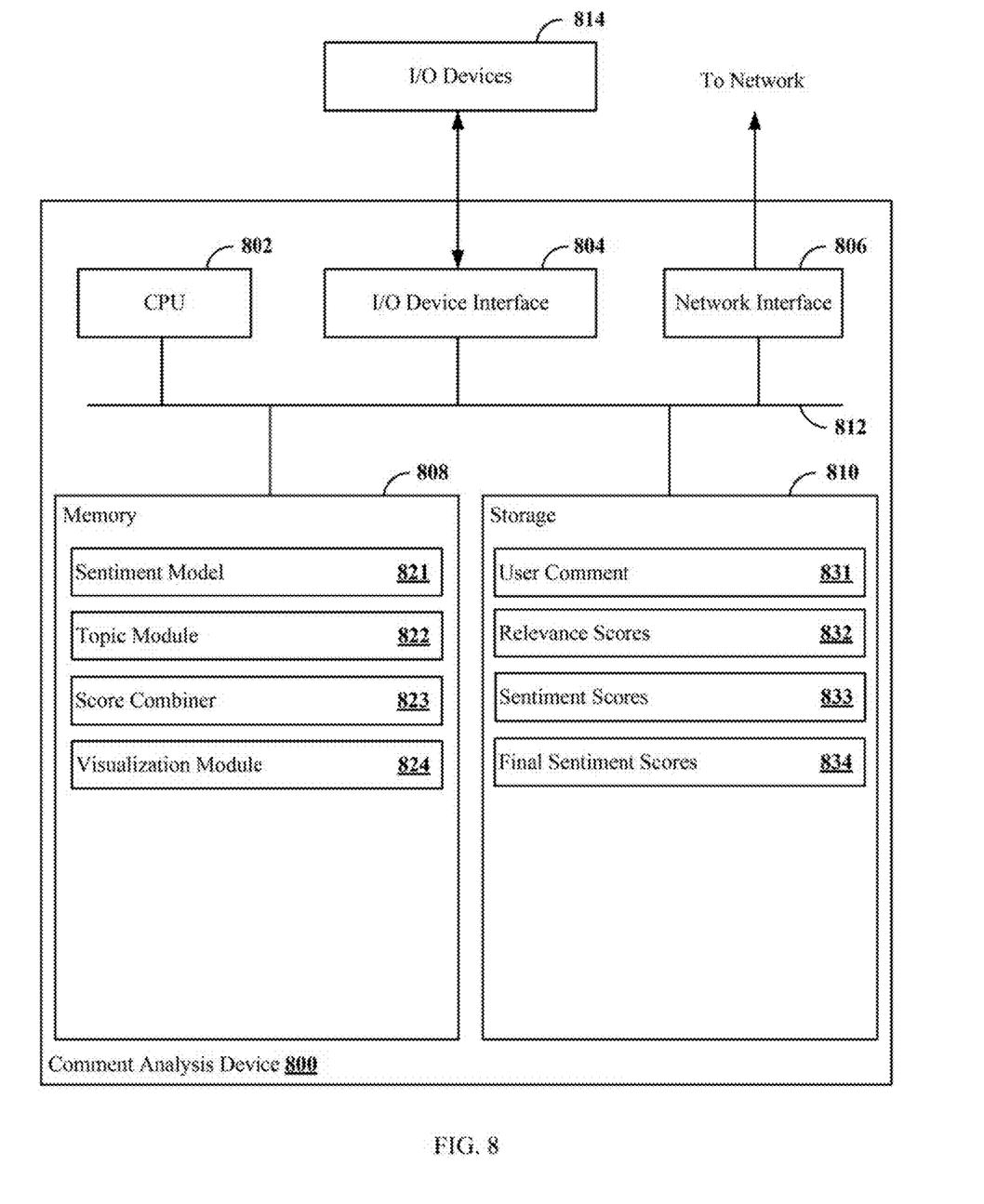
FIG. 8 depicts an example comment analysis system for use in displaying sentiment of a user text comment.

FIG. 8 depicts an example comment analysis system 800 for use in displaying sentiment of a user text comment. As shown, the comment analysis system 800 includes, without limitation, a central processing unit (CPU) 802, one or more input/output (I/O) device interfaces 804, which may allow for the connection of various I/O devices 814 (e.g., keyboards, displays, mouse devices, pen input, etc.) to comment analysis system 800, network interface 806, memory 808, storage 810, and an interconnect 812.

The CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. The CPU 802 is included to be representative of a single CPU, multiple CPUs, a single CPU having multiple processing cores, and the like. The I/O device interface 804 may provide an interface for capturing data from one or more input devices integrated into or connected to the comment analysis system 800, such as keyboards, mice, touchscreens, and so on. The memory 808 may represent a random access memory (RAM), while the storage 810 may be a solid state drive, for example. Although shown as a single unit, the storage 810 may be a combination of fixed and/or removable storage devices, such as fixed drives, removable memory cards, network attached storage (NAS), or cloud-based storage.

As shown, the memory 808 includes sentiment model 821, topic module 822, score combiner 823 and visualization module 824, which are software routines executed based on instructions stored in the storage 810. Such instructions may be executed by the CPU 802.

As shown, the storage 810 includes user comment 831, relevance scores 832, sentiment scores 833 and final sentiment scores 834. User comment 831 may be obtained from a comment repository and used to generate input for sentiment model 821 and topic module 822. Sentiment model 821 outputs sentiment scores 833 and topic module 822 outputs relevance scores 832. Score combiner 823 combines sentiment scores 833 and relevance scores 832 to determine final sentiment scores 834. Visualization module 824 then generates a sentiment visualization based on final sentiment scores 834.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 75 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for displaying sentiment of a user text comment, comprising:
   receiving a text comment comprising a sequence of words;
   providing a vector sequence representing the sequence of words to a sentiment model configured to output a sequence of sentiment scores for the vector sequence, wherein the sentiment model is a bidirectional short long term memory (Bi-LSTM) model trained using user comments labeled with comment ratings;
   providing cleaned text to a topic module configured to determine relevance scores between the cleaned text and each topic of a plurality of topics and output the relevance scores;
   receiving, from the sentiment model, the sequence of sentiment scores for the vector sequence;
   receiving, from the topic module, the relevance scores for the cleaned text;
   determining, based on the sequence of sentiment scores for the vector sequence and the relevance scores for the cleaned text, final sentiment scores for each word of the sequence of words; and
   generating, based on the final sentiment scores, a sentiment visualization for the sequence of words showing the final sentiment scores corresponding to each word of the sequence of words.

2. The method of claim 1, further comprising:
   receiving a plurality of previous final sentiment scores from a sentiment repository; and
   generating, based on the final sentiment scores and the plurality of previous final sentiment scores, a sentiment trend for each topic of the plurality of topics showing a change in sentiment over time for each topic of the plurality of topics.

3. The method of claim 2, further comprising generating a trend visualization for each topic of the plurality of topics based on the sentiment trend for each topic.

4. The method of claim 3, wherein the trend visualization is a box graph color coded by topic.

5. The method of claim 3, wherein the trend visualization is a radar chart for a given month, wherein each wedge of the radar chart represents a topic of the plurality of topics, a width of each wedge represents a volume of the topic and a radius, and color of each wedge represents a strength of sentiment for the topic.

6. The method of claim 1, wherein, prior to being provided the cleaned text, the topic module plots vector representations of a plurality of keywords associated with the plurality of topics.

7. The method of claim 6, wherein the topic module determines the relevance scores by determining a cosine similarity between vector representations of the cleaned text and the vector representations of the plurality of keywords.

8. The method of claim 1, wherein a sentiment score for each vector of the vector sequence are weighted based on sentiment scores for preceding vectors in the vector sequence.

9. A computing device, comprising:
   a processor; and
   a memory including computer readable instructions, which, when executed by the processor, cause the computing device to perform a method for displaying sentiment of a user text comment, the method comprising:
      receiving a text comment comprising a sequence of words;
      providing a vector sequence representing the sequence of words to a sentiment model configured to output a sequence of sentiment scores for the vector sequence;
      providing a vector sequence representing the sequence of words to a sentiment model configured to output a sequence of sentiment scores for the vector sequence;
      receiving, from the sentiment model, the sequence of sentiment scores for the vector sequence;
      receiving, from the topic module, the relevance scores for the cleaned text;
      determining, based on the sequence of sentiment scores for the vector sequence and the relevance scores for the cleaned text, final sentiment scores for each word of the sequence of words; and
      generating, based on the final sentiment scores, a sentiment visualization for the sequence of words showing the final sentiment scores corresponding to each word of the sequence of words.

10. The computing device of claim 9, the method further comprising:
    receiving a plurality of previous final sentiment scores from a sentiment repository; and
    generating, based on the final sentiment scores and the plurality of previous final sentiment scores, a sentiment trend for each topic of the plurality of topics showing a change in sentiment over time for each topic of the plurality of topics.

11. The computing device of claim 10, the method, further comprising generating a trend visualization for each topic of the plurality of topics based on the sentiment trend for each topic.

12. The computing of claim 11, wherein the trend visualization is a box graph color coded by topic.

13. The computing device of claim 11, wherein the trend visualization is a radar chart for a given month, wherein each wedge of the radar chart represents a topic of the plurality of topics, a width of each wedge represents a volume of the topic and a radius, and color of each wedge represents a strength of sentiment for the topic.

14. The computing device of claim 9, wherein, prior to being provided the cleaned text, the topic module plots vector representations of a plurality of keywords associated with the plurality of topics.

15. The computing device of claim 14, wherein the topic module determines the relevance scores by determining a cosine similarity between vector representations of the cleaned text and the vector representations of the plurality of keywords.

16. The computing device of claim 9, wherein a sentiment score for each vector of the vector sequence are weighted based on sentiment scores for preceding vectors in the vector sequence.

17. A non-transitory computer readable medium comprising instructions, which when executed by a processor of a computing device, cause the computing device to perform a method for displaying sentiment of a user text comment, the method comprising:
   receiving a text comment comprising a sequence of words;
   providing a vector sequence representing the sequence of words to a sentiment model configured to output a sequence of sentiment scores for the vector sequence, wherein the sentiment model is a bidirectional short long term memory (Bi-LSTM) model trained using user comments labeled with comment ratings;
   providing cleaned text to a topic module configured to determine relevance scores between the cleaned text and each topic of a plurality of topics and output the relevance scores;
   receiving, from the sentiment model, the sequence of sentiment scores for the vector sequence;
   receiving, from the topic module, the relevance scores for the cleaned text;
   determining, based on the sequence of sentiment scores for the vector sequence and the relevance scores for the cleaned text, final sentiment scores for each word of the sequence of words; and
   generating, based on the final sentiment scores, a sentiment visualization for the sequence of words showing the final sentiment scores corresponding to each word of the sequence of words.

18. The computer readable medium of claim 17, the method further comprising:
   receiving a plurality of previous final sentiment scores from a sentiment repository; and
   generating, based on the final sentiment scores and the plurality of previous final sentiment scores, a sentiment trend for each topic of the plurality of topics showing a change in sentiment over time for each topic of the plurality of topics.

19. The computer readable medium of claim 18, the method, further comprising generating a trend visualization for each topic of the plurality of topics based on the sentiment trend for each topic.

20. The computer readable medium of claim 17, wherein a sentiment score for each vector of the vector sequence are weighted based on sentiment scores for preceding vectors in the vector sequence.

* * * * *